US011376900B2

(12) United States Patent
Broadfield

(10) Patent No.: US 11,376,900 B2
(45) Date of Patent: Jul. 5, 2022

(54) VEHICLE WHEEL MONITORING SYSTEM

(71) Applicant: ITIREAIR LTD., Burntwood (GB)

(72) Inventor: Gary Broadfield, Burntwood (GB)

(73) Assignee: TiZap Ltd, Staffordshire (GB)

( * ) Notice: Subject to any disclaimer, the term of this patent is extended or adjusted under 35 U.S.C. 154(b) by 0 days.

(21) Appl. No.: 17/262,674

(22) PCT Filed: Jul. 24, 2019

(86) PCT No.: PCT/EP2019/069988
§ 371 (c)(1),
(2) Date: Jan. 22, 2021

(87) PCT Pub. No.: WO2020/020985
PCT Pub. Date: Jan. 30, 2020

(65) Prior Publication Data
US 2021/0300130 A1 Sep. 30, 2021

(30) Foreign Application Priority Data
Jul. 24, 2018 (GB) ...................................... 1812029

(51) Int. Cl.
*B60C 23/04* (2006.01)
(52) U.S. Cl.
CPC ...... *B60C 23/0479* (2013.01); *B60C 23/0413* (2013.01); *B60C 23/0452* (2013.01); *B60C 23/0496* (2013.01)
(58) Field of Classification Search
CPC ............ B60C 23/0479; B60C 23/0413; B60C 23/0452; B60C 23/0496; B60C 23/041; B60C 23/0428
(Continued)

(56) References Cited

U.S. PATENT DOCUMENTS 6,486,776 B1 * 11/2002 Pollack ............... B60C 23/0408
340/442
7,250,852 B1 * 7/2007 Kell .................... B60C 23/0408
340/10.1
(Continued)

FOREIGN PATENT DOCUMENTS

DE 102007008248 A1 9/2007
EP 301443 2/1989
(Continued)

OTHER PUBLICATIONS

GB Search Report from corresponding GB Patent Application No. GB1812029.5 dated Dec. 13, 2018, 6 pages.
(Continued)

*Primary Examiner* — Eric Blount
(74) *Attorney, Agent, or Firm* — Lee & Hayes, P.C.

(57) ABSTRACT

A mobile electronic device (102, 300), and a method, for obtaining a tyre pressure reading from a tyre pressure sensor module (700) fitted to a valve of a pneumatic tyre (106), a tyre pressure sensor module, a locating feature (304, 400) and a tyre pressure gauge system comprising the above. The mobile electronic device comprising: a transmitter (202) and a receiver (200) to transmit and receive telecommunications signals over a distance of up to 4 cm to obtain the tyre pressure reading; and a locating feature to indicate when the transmitter and/or receiver are located within 4 cm or less of the tyre pressure sensor module. The tyre pressure sensor module comprising an antenna to detect a telecommunications signal from a mobile electronic device over a distance of up to 4 cm, a transmitter (902), a receiver (904) and a pressure sensor (916) to measure tyre pressure.

20 Claims, 10 Drawing Sheets

(a)

(58) Field of Classification Search
USPC .......................................................... 340/445
See application file for complete search history.

(56) References Cited

U.S. PATENT DOCUMENTS

| | | | | |
|---|---|---|---|---|
| 8,098,146 | B2* | 1/2012 | Petrucelli | B60C 23/0496 340/442 |
| 9,114,670 | B2* | 8/2015 | Kumagai | G07C 9/00309 |
| 2007/0046427 | A1* | 3/2007 | Ghabra | B60C 23/0408 340/5.61 |
| 2007/0193349 | A1* | 8/2007 | Petrucelli | B60C 23/0408 73/146.8 |
| 2009/0109012 | A1* | 4/2009 | Petrucelli | G01L 17/00 340/445 |
| 2015/0029016 | A1* | 1/2015 | Lesesky | B60C 23/045 340/442 |
| 2016/0375733 | A1* | 12/2016 | Lesesky | B60C 23/0483 340/442 |
| 2017/0282855 | A1* | 10/2017 | Barrios | B60R 25/32 |
| 2020/0262255 | A1* | 8/2020 | Damm | B60C 23/0433 |

FOREIGN PATENT DOCUMENTS

| | | |
|---|---|---|
| GB | 2264360 | 2/1993 |
| GB | 250069 A | 10/2013 |
| GB | 2500697 | 10/2013 |
| JP | 2003002019 A | 1/2003 |
| JP | 2014113951 A | 6/2014 |
| JP | 2015089716 | 5/2015 |
| WO | WO2020020985 A1 | 1/2020 |

OTHER PUBLICATIONS

PCT International Preliminary Report on Patentability for corresponding PCT Application No. PCT/EP2019/069988 dated Feb. 4, 2021, 8 pages.

International Search Report for corresponding PCT Application PCT/EP2019/069988, dated Jan. 30, 2020, a counterpart foreign application for US Patent Application, 4 pages.

Written Opinion for corresponding PCT Application PCT/EP2019/069988, dated Jan. 30, 2020, a counterpart foreign application for US Patent Application, 6 pages.

* cited by examiner (a)

VEHICLE WHEEL MONITORING SYSTEM

This Application, filed under 35 U.S.C. § 371, is a US National Stage application of PCT/EP2019/069988 filed Jul. 24, 2019, which claims priority to GB 1812029.5, filed Jul. 24, 2018, which is incorporated herein by reference.

TECHNICAL FIELD

The invention relates to tyre pressure gauge systems. More specifically, the invention relates to methods and apparatus for obtaining a tyre pressure reading from a tyre pressure sensor module.

BACKGROUND

Exemplary tyre pressure sensor modules may be fitted to a valve or other inlet of a pneumatic tyre. In systems comprising such tyre pressure sensor modules, an electronic device may be used to obtain a reading from a tyre pressure sensor module wirelessly.

In such arrangements, the tyre pressure sensor module and the electronic device may be configured to use a short range telecommunications system and protocol, such as Near-field Communication (NFC). Accordingly, the electronic device may transmit a signal to the tyre pressure sensor module requesting a tyre pressure reading. The tyre pressure sensor module may be configured to obtain sufficient electrical power from the transmitted signal through induction to power the electronic equipment necessary to transmit a response to the request.

Short range telecommunications systems are effective only over short distances. In addition, tyre pressure sensor modules are commonly awkwardly located for users of the mobile electronic device because they are low to the ground.

SUMMARY

In view of the above, it is an object of the invention to improve the usability of mobile electronic devices for reading tyre pressure sensor modules using short range telecommunications systems. Accurate positioning of the tyre sensor module with respect to a transmitter and/or receiver of the mobile electronic device is important for correct operation and to allow the tyre pressure to be read. In some exemplary short range telecommunications systems, the effective range may be less than 5 cm. An object of the invention may therefore be to assist a user of the mobile electronic device to position the transmitter and/or receiver of that device correctly with respect to the tyre pressure sensor module.

In addition, short range telecommunications systems overcome some issues with prior art tyre pressure gauge systems in that it can remove the need to identify signals from different tyre pressure sensor modules. That is, only one signal may be received at any one time due to the short ranges involved. This is particularly useful for multi-wheeled vehicles and more particularly, vehicles having multiple wheels on a one side of a single axle.

It is noted that the term "short range" in respect of telecommunications systems is well known in the art and would not be unclear to a skilled person. It may, for example refer to dedicated short range communications or the like. Exemplary short range telecommunications systems may include NFC and/or may refer to telecommunications systems with a maximum range of 4 cm or less.

Also disclosed is a mobile electronic device for obtaining a tyre pressure reading from a tyre pressure sensor module fitted to a valve of a pneumatic tyre, the mobile electronic device comprising: a transmitter configured to transmit a telecommunications signal to the tyre pressure sensor module over a distance of up to 4 cm, wherein the telecommunications signal is configured to be received by the tyre pressure sensor module and to instruct the tyre pressure sensor module to transmit a tyre pressure reading; a receiver configured to receive a telecommunications signal from the tyre pressure sensor module over a distance of up to 4 cm, the received telecommunications signal comprising the tyre pressure reading; and a locating feature configured to provide an indication to a user of the mobile electronic device when the transmitter and/or receiver are located within 4 cm or less of the tyre pressure sensor module.

Optionally, the locating feature is configured to receive at least part of the tyre pressure sensor module.

Optionally, the locating feature comprises a keyed recess into which a correspondingly keyed portion of the tyre pressure sensor module may be received.

Optionally, the locating feature further comprises an indicator unit configured to provide one or more of an audio, visual or haptic indication to the user.

Optionally, the receiver is configured, upon receiving the telecommunications signal from the tyre pressure sensor module, to control the indicator unit to provide the indication to the user.

Optionally the mobile electronic device comprises a smartphone or tablet computing device.

Optionally, the transmitter and the receiver are configured to transmit and receive telecommunications signals using a short range telecommunications protocol configured to induce a voltage in the tyre pressure sensor module sufficient to power the tyre pressure sensor module to transmit the received telecommunications signal.

Optionally, the short range telecommunications protocol comprises a near-field communication (NFC) telecommunications protocol.

Optionally, the transmitter is configured to transmit the short range telecommunications signal at a frequency of substantially 13.56 MHz Also disclosed herein is a method for obtaining a tyre pressure reading from a tyre pressure sensor module fitted to a valve of a pneumatic tyre, the method comprising: providing an indication to a user of a mobile electronic device when a transmitter and receiver of the mobile electronic device are located within 4 cm or less of the tyre pressure sensor module; transmitting a telecommunications signal to the tyre pressure sensor module over a distance of up to 4 cm, wherein the telecommunications signal is received by the tyre pressure sensor module and instructs the tyre pressure sensor module to transmit a tyre pressure reading; and receiving a telecommunications signal from the tyre pressure sensor module over a distance of up to 4 cm, the received telecommunications signal comprising the tyre pressure reading.

According to an aspect of the invention, there is provided a computer program comprising instructions which, when executed on at least one processor, cause the at least one processor to carry out any suitable method disclosed herein.

According to an aspect of the invention, there is provided a carrier containing the computer program above, wherein the carrier is one of an electronic signal, optical signal, radio signal, or non-transitory computer readable storage medium.

Also disclosed herein is a locating feature for securing to a housing of a mobile electronic device, the mobile electronic device comprising: a transmitter configured to transmit a telecommunications signal to the tyre pressure sensor module over a distance of up to 4 cm, wherein the telecommunications signal is configured to be received by the tyre pressure sensor module and to instruct the tyre pressure sensor module to transmit a tyre pressure reading; and a receiver configured to receive a telecommunications signal from the tyre pressure sensor module over a distance of up to 4 cm, the received telecommunications signal comprising the tyre pressure reading, wherein the locating feature is securable to the housing of the mobile electronic device such that when at least part of the tyre pressure sensor module is received within the locating feature, the transmitter and receiver are located within 4 cm or less of the tyre pressure sensor module.

Optionally, the locating feature further comprises an adhesive coating on an underside thereof for adhering to the housing of the mobile electronic device.

According to an aspect of the invention, there is provided a mobile electronic device cover for fitting to a mobile electronic device and comprising the locating feature above.

Also disclosed herein is a tyre pressure gauge system comprising: a mobile electronic device and a tyre pressure sensor module, the mobile electronic device for obtaining a tyre pressure reading from a tyre pressure sensor module when fitted to a valve of a pneumatic tyre, wherein the mobile electronic device comprises a transmitter configured to transmit a telecommunications signal comprising a request for a tyre pressure reading to the tyre pressure sensor module over a distance of up to 4 cm, wherein the tyre pressure sensor module comprises a receiver configured to receive the telecommunications signal, a pressure sensor configured to obtain the tyre pressure reading and a transmitter configured to transmit data indicative of a tyre pressure reading, and wherein the mobile electronic device further comprises a receiver configured to receive the transmitted data indicative of the tyre pressure reading over a distance of up to 4 cm, and a locating feature configured to provide an indication to a user of the mobile electronic device when the transmitter and receiver are located within 4 cm or less of the tyre pressure sensor module.

Optionally, the tyre pressure sensor module further comprises an antenna configured to detect the short range telecommunications signal from the mobile electronic device over a distance of up to 4 cm, the antenna further configured to obtain, from the short range telecommunications signal through induction, electrical power sufficient to allow measurement of a pressure of a fluid within the pneumatic tyre and transmission of data indicative of the measured pressure to the mobile electronic device.

According to the invention in a further aspect, there is provided a tyre pressure sensor module according to claim 1. Also disclosed herein is a tyre pressure sensor module for fitting to a valve of a pneumatic tyre, the tyre pressure sensor module comprising: an antenna configured to detect a short range telecommunications signal from a mobile electronic device over a distance of up to 4 cm, the antenna further configured to obtain, from the short range telecommunications signal through induction, electrical power sufficient to allow measurement of a pressure of a fluid within the pneumatic tyre and transmission of data indicative of the measured pressure to the mobile electronic device; a receiver configured to receive the short range telecommunications signal, which comprises instructions to obtain a pressure reading; a pressure sensor configured to measure the pressure of the fluid within the pneumatic tyre; and a transmitter configured to transmit data indicative of the measured pressure to the mobile electronic device using a short range telecommunications signal over a distance of up to 4 cm.

Optionally, the antenna is a loop antenna with a diameter of substantially 10 mm, a width of substantially 0.15 mm and substantially 14 turns.

Optionally, the tyre pressure sensor module comprises no sensors for monitoring a parameter of the tyre and/or wheel other than the pressure sensor and optionally specifically not including a temperature sensor and/or a motion sensor.

Optionally, the electronic components of the tyre pressure sensor module consist of the antenna, pressure sensor and transmitter.

Optionally, the tyre pressure sensor module has a weight of 4 grams or less.

Optionally, the tyre pressure sensor module has a length of substantially 15 mm and a width of substantially 18 mm.

Optionally, the tyre pressure sensor module is configured to interact with a mobile electronic device having a locating feature configured to provide an indication to a user of the mobile electronic device when a transmitter and/or receiver of the mobile electronic device are located within 4 cm or less of the tyre pressure sensor module.

Optionally, at least part of the tyre pressure sensor module is configured to be received within the locating feature.

Optionally, the tyre pressure sensor module comprises a keyed recess configured to be received within a correspondingly keyed portion of the locating feature.

Optionally, the transmitter is further configured to transmit identification data to the mobile electronic device.

Optionally, the identification data associates the data indicative of the measured pressure with the tyre pressure sensor module.

Also disclosed herein is a method for obtaining a tyre pressure reading from a tyre pressure sensor module for fitting to a valve of a pneumatic tyre, the method comprising: detecting, by an antenna, a short range telecommunications signal from a mobile electronic device over a distance of up to 4 cm; obtaining, by the antenna from the short range telecommunications signal through induction, electrical power sufficient to allow measurement of a pressure of a fluid within the pneumatic tyre and transmission of data indicative of the measured pressure to the mobile electronic device; receiving, by a receiver, the short range telecommunications signal, which comprises instructions to obtain a pressure reading; measuring, by a pressure sensor, the pressure of the fluid within the pneumatic tyre; and transmitting, by a transmitter, data indicative of the measured pressure to the mobile electronic device using a short range telecommunications signal over a distance of up to 4 cm.

Optionally, the method further comprises transmitting to the mobile electronic device, by the transmitter, identification data.

Optionally, the identification data associates the data indicative of the measured pressure with the tyre pressure sensor module.

Optionally, the method further comprises transmitting to a server, by a transmitter of the mobile electronic device, a signal confirming data indicative of the measured pressure is received by the mobile electronic device.

Optionally, the method further comprises transmitting to a server, by a transmitter of the mobile electronic device, the data indicative of the measured pressure and/or the identification data.

Also disclosed herein is a tyre pressure gauge system comprising: a mobile electronic device and a tyre pressure sensor module, the tyre pressure sensor module for fitting to a valve of a pneumatic tyre, wherein the mobile electronic device comprises a transmitter configured to transmit a telecommunications signal comprising a request for a tyre pressure reading to the tyre pressure sensor module over a distance of up to 4 cm, wherein the tyre pressure sensor module comprises an antenna configured to receive the telecommunications signal and obtain therefrom, through induction, electrical power sufficient to allow measurement of a pressure of a fluid within the pneumatic tyre and transmission of data indicative of the measured pressure to the mobile electronic device, the tyre pressure sensor module further comprising a pressure sensor configured to measure the tyre pressure and a transmitter configured to transmit data indicative of the measured pressure to the mobile electronic device, and wherein the mobile electronic device further comprises a receiver configured to receive the transmitted data indicative of the tyre pressure reading over a distance of up to 4 cm.

Optionally, the tyre pressure gauge system further comprises a server, wherein a transmitter of the mobile electronic device is configured to transmit to the server, a signal confirming data indicative of the measured pressure has been received by the mobile electronic device.

Optionally, the mobile electronic device is further configured to transmit to the server identification data associating the data indicative of the measured pressure with the tyre pressure sensor module, and/or data indicative of the measured pressure.

Also disclosed herein is a kit of parts comprising a tyre pressure sensor module and a mobile electronic device.

Also disclosed herein is a kit of parts comprising a tyre pressure sensor module and a locating feature for securing to a housing of a mobile electronic device, the mobile electronic device comprising: a transmitter configured to transmit a telecommunications signal to the tyre pressure sensor module over a distance of up to 4 cm, wherein the telecommunications signal is configured to be received by the tyre pressue sensor module and to instruct the tyre pressure sensor module to transmit a tyre pressure reading; and a receiver configured to receive a telecommunications signal from the tyre pressure sensor module over a distance of up to 4 cm, the received telecommuniations signal comprising the tyre pressure reading, wherein the locating feature is securable to the housing of the mobile electronic device such that when at least part of the tyre pressure sensor module is received within the locating feature, the transmitter and receiver are located within 4 cm or less of the tyre pressure sensor module or a locating feature further comprising an adhesive coating on an underside thereof for adhering to the housing of the mobile electronic device and/or a mobile electronic device cover for fitting to a mobile electronic device and comprising the locating feature.

BRIEF DESCRIPTION OF DRAWINGS

Exemplary embodiments of the invention are described herein with reference to the accompanying drawings, in which.

DETAILED DESCRIPTION

Generally, disclosed herein is a means for ensuring correct locating of a tyre pressure sensor module relative to a mobile electronic device to allow establishment of a connection therebetween. In exemplary arrangements where a tyre pressure gauge system comprises a tyre pressure sensor module fitted to a valve of a pneumatic tyre and a mobile electronic device for reading the tyre pressure, a short range telecommunications system may be employed. In such arrangements, it is beneficial to have a means for correctly locating a transmitter and/or receiver of the mobile electronic device and an antenna of the tyre pressure sensor module.

Figure 2:
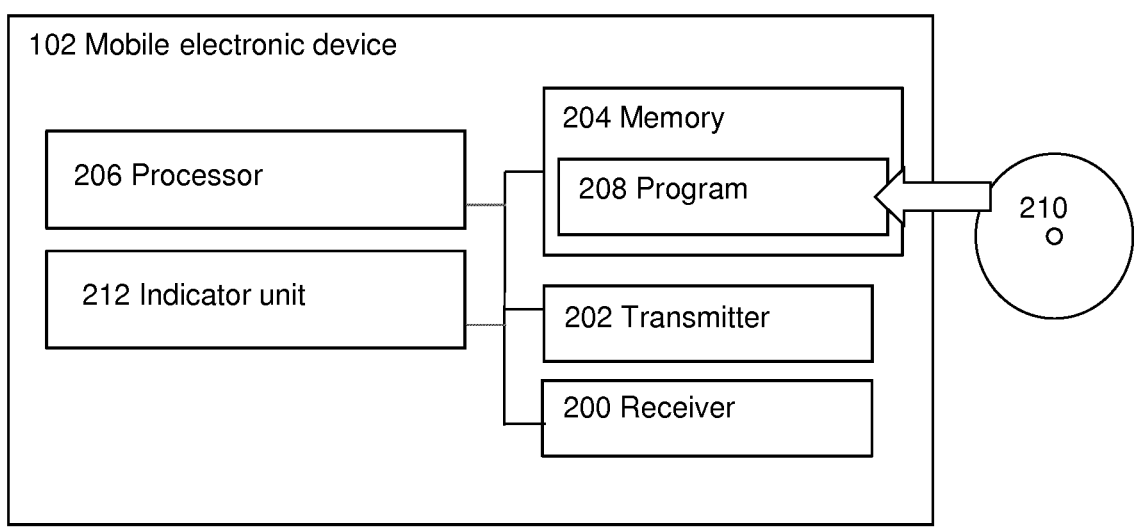
FIG. 2 is a schematic representation of an exemplary mobile electronic device including a locating feature.

FIG. 2 shows an exemplary mobile electronic device, which may be a mobile electronic device 102. The mobile electronic device 102 comprises a transmitter 200 and a receiver 202. The transmitter 200 and receiver 202 may be in data communication with other entities in a telecommunications network and are configured to transmit and receive data accordingly.

The mobile electronic device 102 further comprises a memory 204 and a processor 206. The memory 204 may comprise a non-volatile memory and/or a volatile memory. The memory 204 may have a computer program 208 stored therein. The computer program 208 may be configured to undertake the methods disclosed herein. The computer program 208 may be loaded in the memory 204 from a non-transitory computer readable medium 210, on which the computer program is stored. The processor 206 is configured to undertake one or more of the functions in order to carry out the methods disclosed herein.

Each of the transmitter 200 and receiver 202, memory 204, processor 206 and indicator unit 212 is in data communication with the other features 200, 202, 204, 206, 212 of the mobile electronic device 102. The mobile electronic device 102 can be implemented as a combination of hardware and software. In particular, the steps undertaken in methods disclosed herein may be implemented as software configured to run on the processor 206, or as combinations of hardware and software. The memory 204 stores the various programs/executable files that are implemented by a processor 206, and also provides a storage unit for any required data.

In exemplary arrangements, the mobile electronic device 102 may be configured to transmit and/or receive data using a short range telecommunications system, for example over a range of up to 5 cm, up to 4 cm, up to 3 cm or up to 1 cm. The short range telecommunications system may comprise an antenna at the tyre pressure sensor module 100 that is configured to induce a voltage from a telecommunications signal transmitted by the mobile electronic device 102. Accordingly, the mobile electronic device 102 is configured to transmit a telecommunications signal from which a voltage may be obtained through induction at the antenna of the tyre pressure sensor module 100. The voltage induced at the antenna may be sufficient to power the process required to obtain and transmit the tyre pressure reading.

Figure 1:
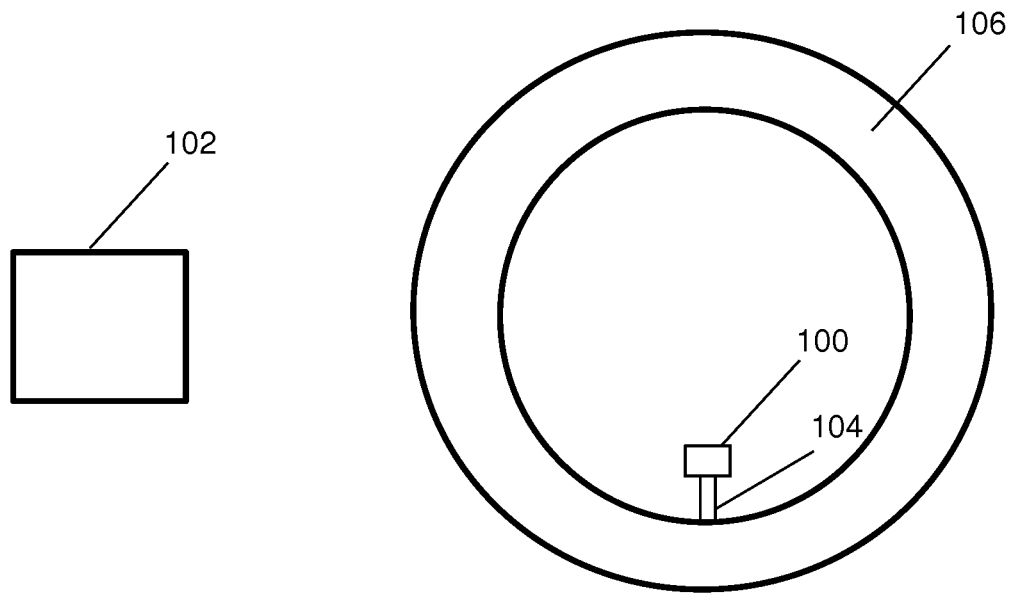
FIG. 1 is a block schematic diagram of a tyre pressure measurement system.
Figure 3A:
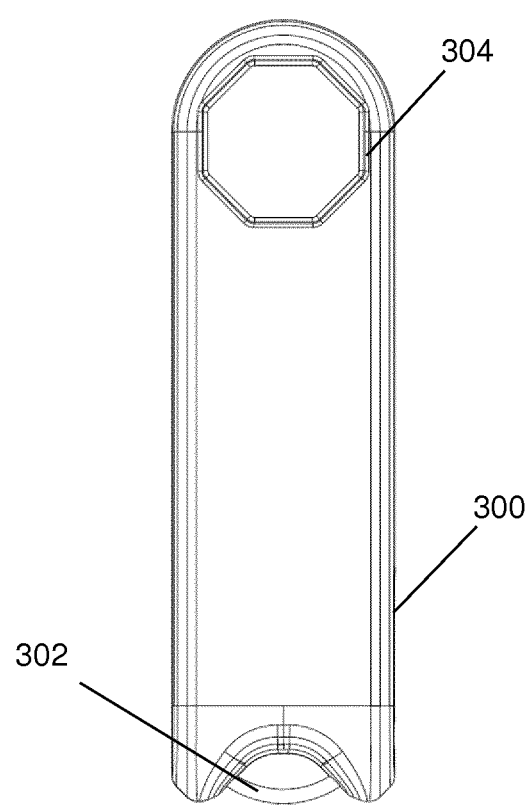
FIG. 3a is an exemplary mobile electronic device including a locating feature.

FIG. 3*a* shows an exemplary mobile electronic device 300, which may be used as a device 102 in FIG. 1. The exemplary mobile electronic device 300 may comprise the features of the mobile electronic 102 shown in FIG. 2. The exemplary mobile electronic device 300 may be used as a key fob and comprises a retaining feature 302, in this case a bar that may be secured to a clip or ring, for attaching the device 300 to a key ring. The exemplary mobile electronic device 300 may comprise a locating feature 304 configured to ensure correct positioning of the antenna of the tyre pressure sensor module 100 relative to the transmitter 200 of the mobile electronic device 300. The locating feature 304 may be a mechanical feature (such as a recess or a protrusion) or the locating feature may be electronic (for example, an electronic arrangement configured to produce an electronic indication of correct positioning, such as a vibration or an audio indication). In some arrangements, the locating feature may comprise both a mechanical feature and an electronic feature.

The mobile electronic device 300 may take any shape and in the case of the example of FIG. 3*a* is broadly rectangular with a curved end formed by a semi-circle. The curved end of the device 300 comprises the locating feature 304. The locating feature is configured to cooperate with the tyre pressure sensor module 100 to locate the tyre pressure sensor module 100 in a predetermined orientation and/or range of the transmitter 200 and/or receiver 202 of the mobile electronic device 300.

In the example of FIG. 3*a*, the locating feature 304 comprises a keyed feature (e.g. an octagon, hexagon, triangle or circle) that is configured to receive, at least partially, a correspondingly shaped tyre pressure sensor module 100. In the example of FIG. 3, the locating feature 304 comprises an octagonal recess that is configured to receive an octagonal tyre pressure sensor module 100. As the tyre pressure sensor module 100 locates within the locating feature 304, an indication is provided to the user that this has occurred, which signifies the tyre pressure sensor module 100 is located in a position relative to the mobile electronic device 300 such that transmission and reception between the two is possible. In some arrangements this may mean that the antenna of the tyre pressure sensor module 100 is within 4 cm of the transmitter 200 and/or receiver 202 of the mobile electronic device 300. In one example, the indication may be the haptic indication that the user may feel when the tyre pressure sensor module 100 locates within the recess of the locating feature 304.

In some arrangements, alternative and/or additional means for providing an indication to the user may be utilised. For example, magnetic force may be used. That is, at least one magnet may be located in one or both of the mobile electronic device 300 and the tyre pressure sensor module 100 to align the two. The magnetic force generated by the at least one magnet may provide a haptic indication to the user that the tyre pressure sensor module is correctly located.

In some arrangements, the locating feature comprises an indicator unit 212. The indicator unit 212 may be configured to detect when a telecommunications signal is received by the mobile electronic device 300 from the tyre pressure sensor module 100 and then to produce an indication to the user, such as a visual, audio or haptic indication. The haptic indication may be a vibration of the device 300. The telecommunications signal may comprise a tyre pressure reading such that the indication unit indicates to the user that the tyre pressure reading has been received by the mobile electronic device 300. This indicates to the user when they can bring the mobile electronic device out of alignment with the tyre pressure sensor module, if the position of the tyre pressure sensor module 100 is such that the user cannot see the mobile electronic device 300 is not visible to the user.

The indicator unit 212 may be utilised in addition to the keyed feature as described above. Alternatively, the indicator unit may be used in isolation from the keyed feature, such that the visual, audio or haptic indication generated by the indicator unit provides an indication to the user of correct alignment.

Figure 3B:
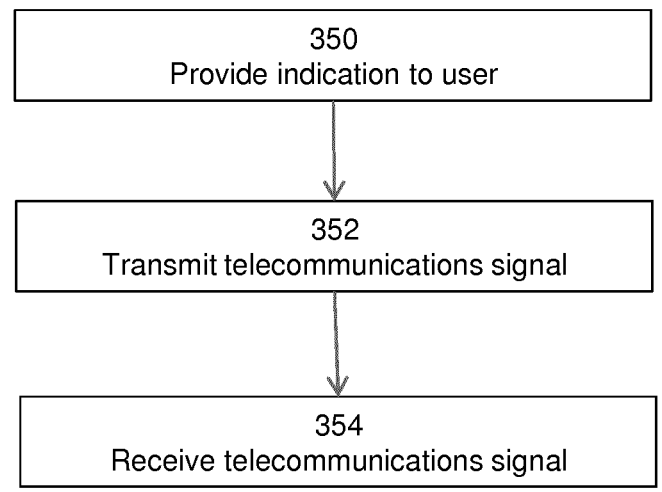
FIG. 3b is a flow diagram showing a method for obtaining a tyre pressure reading

FIG. 3*b* shows a flow diagram for obtaining a tyre pressure reading using a mobile electronic device 102 as disclosed herein. The method comprises a user of a mobile electronic device 102 placing the mobile electronic device 102 in proximity to a tyre pressure sensor module 100. By any of the means disclosed herein, the mobile electronic device 102 is configured to provide 350 an indication to the user that the transmitter 200 and/or receiver 202 of the mobile electronic device 102 are located within 4 cm or less of the tyre pressure sensor module 100.

The transmitter 200 then transmits 352 a telecommunications signal to the tyre pressure sensor module 100. The telecommunications signal is received by the tyre pressure sensor module 100 and instructs the tyre pressure sensor module 100 to transmit a tyre pressure reading.

The receiver 202 receives 354 a telecommunications signal from the tyre pressure sensor module 100, the received telecommunications signal comprising the tyre pressure reading.

Alternatively or additionally, the indicator unit 212 may provide an indication to the user to confirm that the telecommunications signal has been received by the receiver 202. This indication may confirm that the tyre pressure reading has been received by the receiver 202. The indication may occur after the initial indication to the user that the transmitter 200 and/or receiver 202 of the mobile electronic device 102 are located within 4 cm or less of the tyre pressure sensor module 100.

Figure 4:
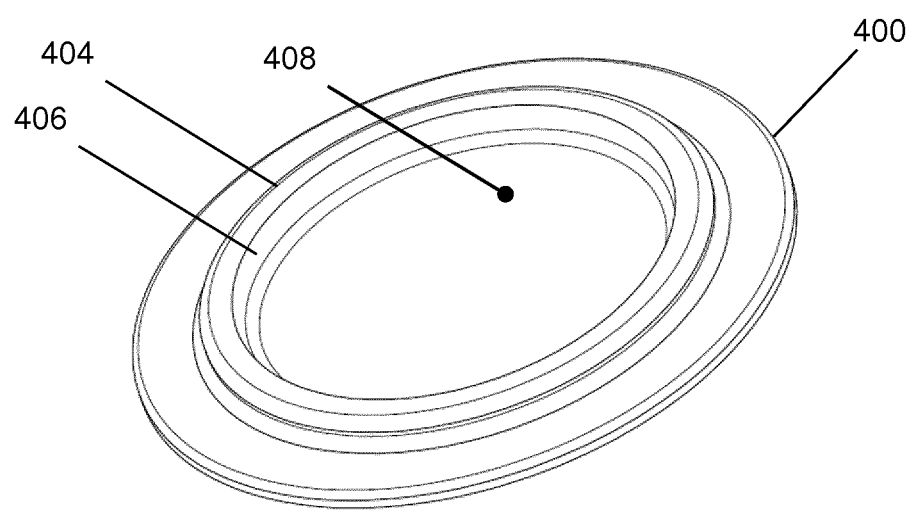
FIG. 4 is a locating feature for fixing to a mobile electronic device.

Referring to FIG. 4, a locating feature 400 is shown that may adhered or otherwise fixed to an existing mobile electronic device 102. In the example of FIG. 4, the locating feature is a sticker 400 with a raised or embossed design thereon to create a locating feature 404. The locating feature 404 may the same or similar to the locating feature 304 described already in respect of FIG. 3. In alternative arrangements, the locating feature may be moulded and adhered to the mobile electronic device using a suitable adhesive.

Accordingly, the sticker 400 comprises a raised or embossed feature having sidewalls 406 defining a recess 408. The recess 408 is configured to receive, at least partially, the profile of a tyre pressure sensor module 100. Although the sidewalls 406 define a circular recess 408, any other shaped recess (e.g. an octagon, hexagon, triangle) may be used to correspond to the profile of the tyre pressure sensor module 100. This may produce a keyed recess only receiving the tyre pressure sensor module in a limited number of orientations. The sticker 400 may have an adhesive backing (not shown) for adhering the sticker 400 to an existing mobile electronic device 102.

Figure 5:
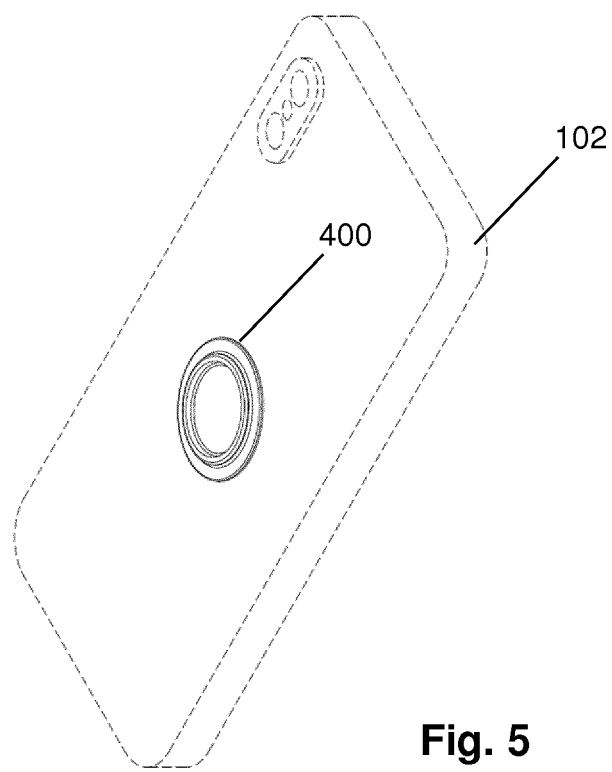
FIG. 5 is an exemplary locating feature fixed to a mobile electronic device.

FIG. 5 shows an exemplary sticker 400 adhered to a smart phone 102, although it could be adhered to any other type of mobile electronic device. The sticker 400 is positioned such that when a tyre pressure sensor module 100 is correctly located with respect to the sticker 400, e.g. at least partially received in the recess 408, then the tyre pressure sensor module 100 is within range of the transmitter 200 and/or receiver 202 of the smart phone 102. In the example of FIG. 5, the sticker 400 is shown centrally located on the smart phone 102, although other locations may be used dependent on the structure of the smart phone 102.

Figure 6:
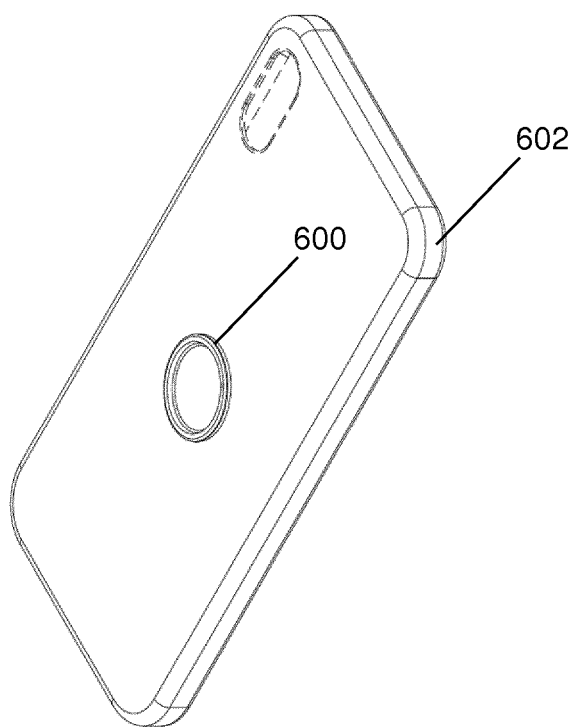
FIG. 6 is an exemplary cover for a mobile electronic device comprising a locating feature.

FIG. 6 shows an alternative arrangement in which a locating feature 600 that is the same or similar to other locating features described herein is positioned on a cover 602 for a mobile electronic device, in this case a smart phone 102. The locating feature 600 is positioned on the cover 600 such that when a tyre pressure sensor module 100 is correctly located with respect to the locating feature 600, e.g. at least partially received in the recess, and the cover is fitted to the mobile electronic device 102 then the tyre pressure sensor module 100 is within range of the transmitter 200 and/or receiver 202 of the mobile electronic device 102. In the example of FIG. 6, the locating feature 600 is shown centrally located on cover 602, although other locations may be used dependent on the structure of the mobile electronic device 102 to which the cover is to be fitted. In alternative arrangements, the locating feature 600 may be an aperture in the phone case, the aperture positioned such that when a tyre pressure sensor module 100 is received within the aperture, the tyre pressure sensor module 100 is within range of the transmitter 200 and/or receiver 202 of the mobile electronic device 102. In yet further arrangements, the locating feature may be a recess in the case that does not have raised or embossed sidewalls. That is, the upper edge of the recess may be flush with the outer surface of the case.

In use, a user of the tyre pressure gauge system may walk around the vehicle with the mobile electronic device 102. The user may hold the mobile electronic device 102 in close proximity to the tyre pressure sensor module 100 (this may comprise using a locating feature as described herein). As discussed above, when the mobile electronic device 102 is in close proximity to the tyre pressure sensor module 100, it may transmit a signal that provides power to the tyre pressure sensor module 100. The power may be sufficient to enable determination of the pressure of air in the pneumatic tyre 106 of the vehicle. The determined pressure may be transmitted to the mobile electronic device 102 for display to the user.

In exemplary tyre pressure systems, the mobile electronic device may be configured to transmit a short range telecommunications signal to the tyre pressure module. The short range telecommunications signal may allow an antenna of the tyre pressure sensor unit to obtain sufficient electrical power to allow measurement of a pressure of a fluid within the pneumatic tyre and transmission of data indicative of the measured pressure to the mobile electronic device. As such, exemplary tyre pressure sensor units may be battery-less, allowing for production of a sensor unit of reduced size, weight, complexity and power consumption.

Additional tyre pressure sensor module size and weight reductions may be achieved by reducing the size of the antenna of the tyre pressure module. Traditionally, this would not be desirable, since reducing the antenna size may affect the transmission range. It may also mean that the mobile electronic device needs to be placed in closer proximity to and more accurately located with respect to the pressure sensor unit to allow a pressure reading to be taken, which may be difficult for the user of the mobile electronics device, particularly if the tyre pressure sensor module is not visible.

However, the inventors have realised that on vehicles having multiple tyres in close proximity, such as those having multiple axles closely located or having multiple tyres on each side of a single axle, a reduced transmission range may be desirable. A reduced transmission range allows separate tyre pressures to be read without the need for the mobile electronic device to identify and distinguish the pressure sensor module it wishes to read from others on the vehicle. Because only pressure sensor modules within a small range can be read, it is clear which sensor module is providing a particular pressure reading.

The tyre pressure sensor module is now described in greater detail.

Figure 7A:
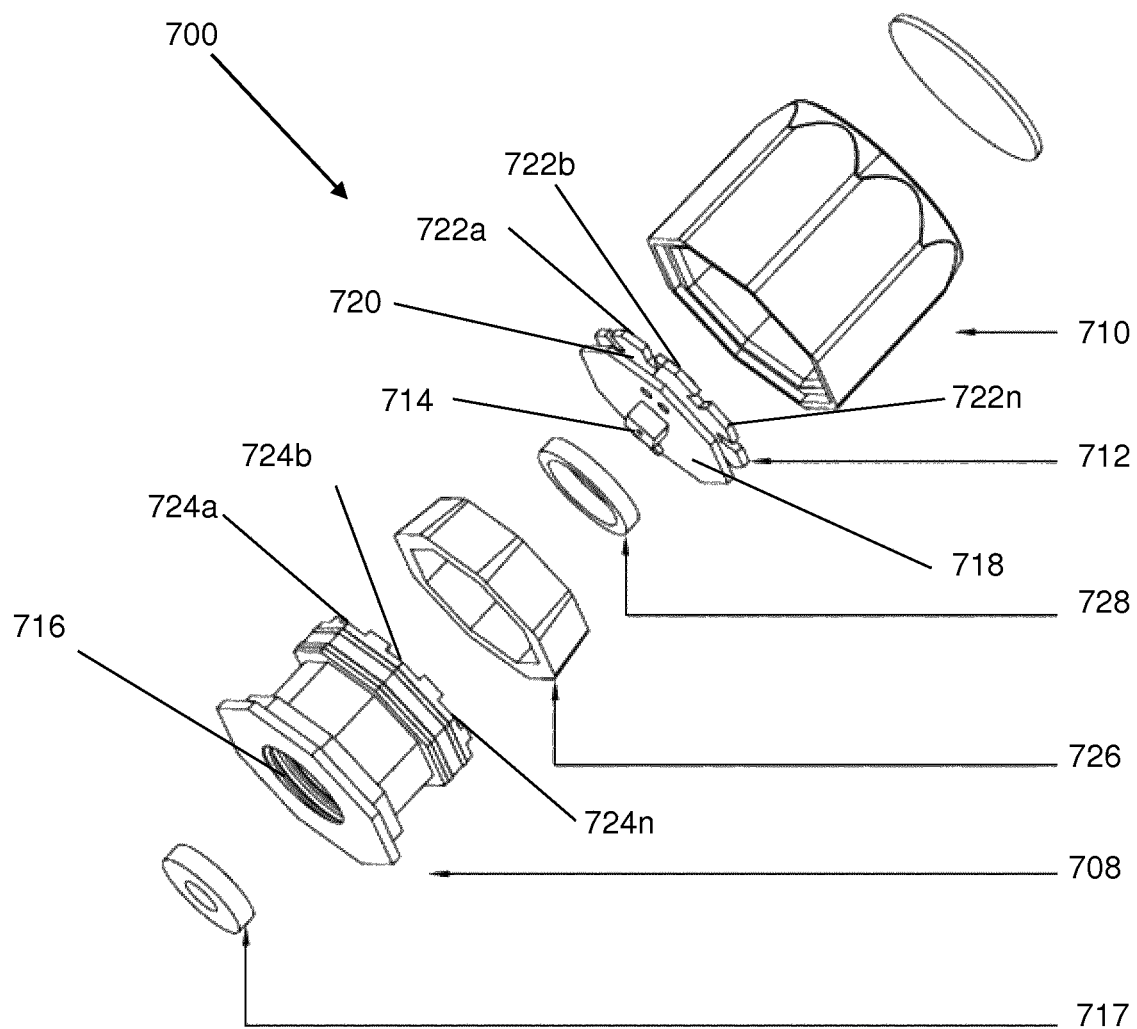
FIG. 7a is an exemplary tyre pressure sensor module.
Figure 8:
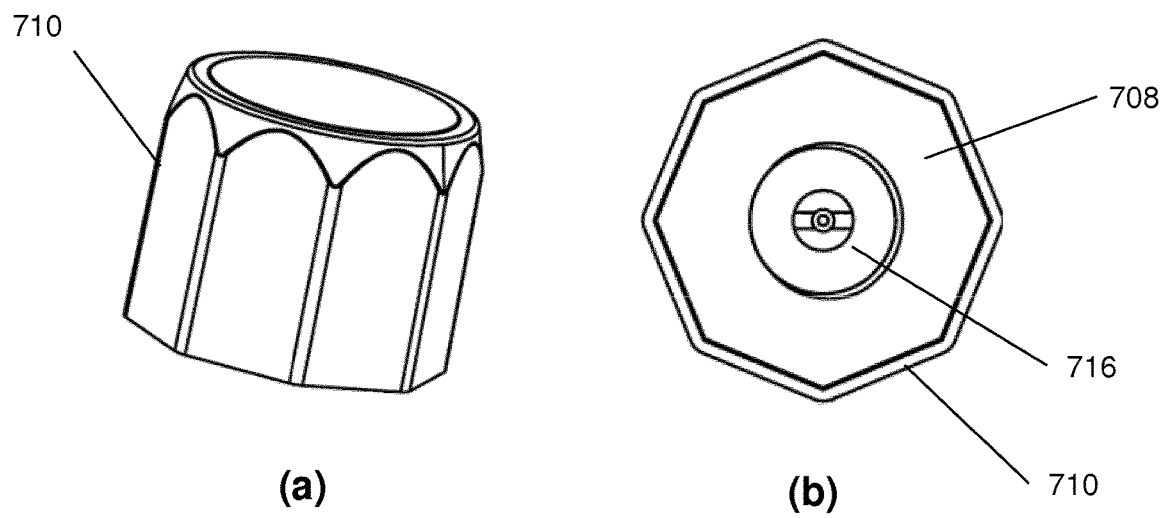
FIG. 8a is an isometric view of an exemplary tyre pressure sensor module.
FIG. 8b is a bottom view of an exemplary tyre pressure sensor module.

Referring to FIGS. 7*a*, 8*a* and 8*b*, the tyre pressure sensor module 700 comprises a housing split into a forward portion 708, a rear portion 710 and sensor electronics 712 comprising a pressure sensor 714.

The forward portion 708 comprises an internal thread 716 for screwing onto a threaded portion of the valve 104 of a pneumatic tyre 106. The valve 104 may be of a Schrader valve structure.

The forward portion 708 may also comprise a valve actuation member (not shown) configured to open the tyre valve on attachment of the tyre pressure sensor module 700 thereto. In the example of a Schrader valve, the actuation member protrudes into the valve structure to depress a valve stem and open the valve. The forward portion 708 is configured to form an airtight seal with the tyre valve by way of interaction between the internal thread 716 and the threaded portion of the valve. In this way, air is only required to be released from the tyre 102 and into the volume surrounding the valve structure on fitting the tyre pressure sensor module. Exemplary tyre pressure sensor modules 700 may also comprise a valve plug 717 configured to provide an airtight seal with the tyre valve 104.

The forward portion 708 may also comprise a fluid communication path (not shown). The fluid communication path may extend from the internal thread 716 to the sensor electronics 712. The fluid communication path is configured to allow air (or other fluid) from within the pneumatic tyre 106 to pass from the open valve 104 to the pressure sensor 714.

The sensor electronics 712 may be mounted on a printed circuit board (PCB) 718. The sensor electronics 712 may comprise the pressure sensor 714, an antenna and a microprocessor. In one exemplary arrangement, the sensor electronics may consist of the pressure sensor 714, the antenna and the microprocessor, which may include a receiver and a transmitter. It is noted that in the context of such arrangements, sensor electronics encompasses electronic apparatus having a defined electronic operation within the context of the device itself, for example the pressure sensor, receiver, transmitter and antenna. The term electronic component as used in that context does not encompass elemental components such as wires, PCB track, resistors, capacitors etc.

Figure 7B:
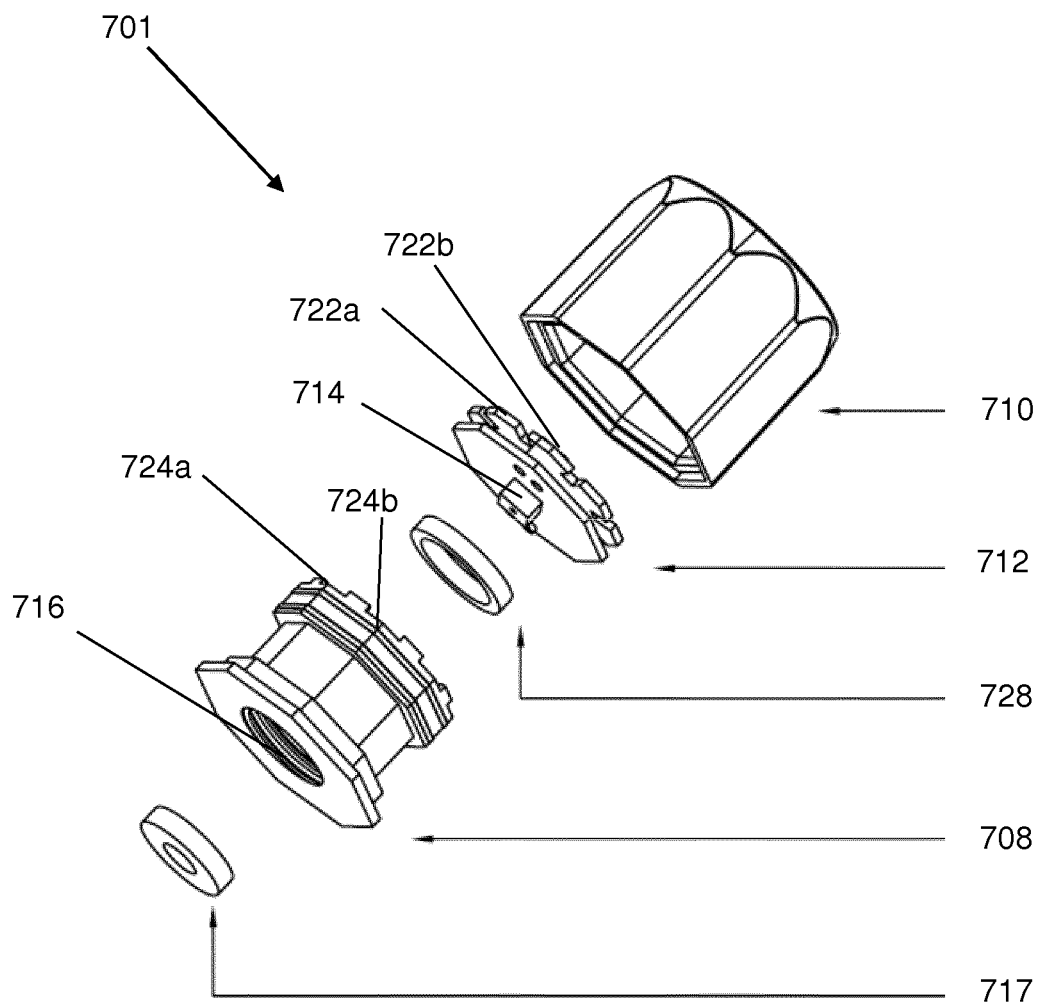
FIG. 7b is an exemplary tyre pressure sensor module.

In the exemplary tyre pressure sensor module of FIG. 7, the antenna may be a loop antenna. The antenna may have a diameter of substantially 10 mm, a width of substantially 0.15 mm and comprise 14 turns. The antenna may additionally have a thickness of substantially 0.35 mm and a track width of substantially 0.15 mm Exemplary tyre pressure sensor modules may be batteryless. The antenna may be configured to receive a short range telecommunications signal and draw power therefrom such that the pressure sensor 714 can take a pressure reading. Exemplary antennas may be configured to draw sufficient power from the telecommunications signal over a distance of up to 4 cm. The telecommunications signal may be an NFC signal.

The PCB 718 may comprise to a locating member 720 configured to interact with a corresponding locating feature of the forward portion 708 to secure the PCB 718 thereto. In the tyre pressure sensor module 700, the locating member 720 comprises locating lugs 722a-n configured to engage with corresponding locating recesses 724a-n on the forward portion 708. Alternatively, the forward portion may comprise locating lugs configured to engage with locating recesses on the PCB 718. Alternative mounting means may be utilised to secure the PCB 718 to the forward portion 708. The locating member 720 may be configured to ensure that the PCB 718 is mounted to the forward portion 708 such that the pressure sensor 714 is positioned to enable pressure readings to be taken.

The rear portion 710 is of substantially cup-like shape and is configured to surround the sensor electronics and body of the forward portion 708 when secured thereto. As shown in FIGS. 8a and 8b, which show an isometric view and a bottom view of the tyre pressure sensor unit 700 respectively, the rear portion 710 surrounds substantially all of the body of the forward portion 708 such that only the internal thread 716 and underside of the forward portion 708 are left exposed.

A housing seal 726 may be secured between the forward portion 708 and the rear portion 710 to provide a watertight seal to prevent water ingress to the sensor electronics 712. The watertight seal may comprise an O-ring configured to surround the PCB 718. In alternative arrangements (see, for example, FIG. 7b), the tyre pressure sensor module may not comprise a housing seal. In such arrangements, the forward portion 708 may be secured to the rear portion 710 with an adhesive or ultrasonic weld to form a watertight seal. The tyre pressure sensor module 700 may further comprise a pressure sensor seal 728 configured to surround the pressure sensor 714 and provide further protection against water ingress.

Exemplary tyre pressure sensor modules 100, 700 may have a substantially circular, hexagonal, square or octagonal profile when viewed from the top. Further, exemplary tyre pressure sensor modules 100, 700 may be configured to interact with a locating feature of a mobile electronic device to provide an indication of when the tyre pressure sensor module 100, 700 is aligned with a transmitter and/or receiver of the mobile electronic device to allow telecommunication therebetween. In some examples, tyre pressure sensor modules 100, 700 may be configured to be at least partially received within a recess formed by the locating feature and may have a profile corresponding to a shape of the recess.

Exemplary tyre pressure sensor modules 100, 700 may have a diameter of substantially 18 mm. Further, the length from a forward end of the forward portion 708 to the rearward end of the rear portion 106 may be substantially 15 mm. The weight of exemplary sensor units 102 may be 5 grams or less or may be 4 grams or less.

Figure 7C:
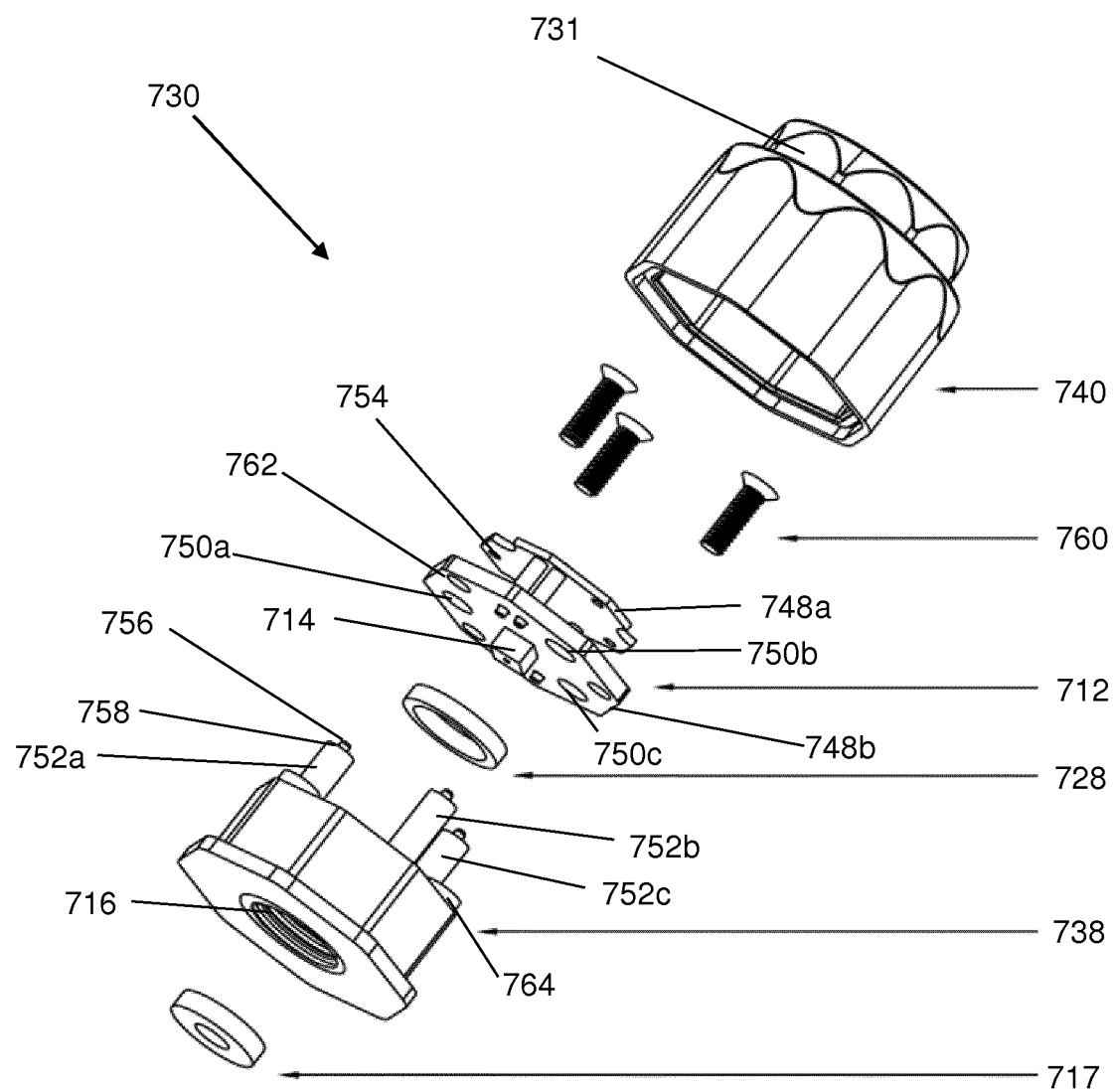
FIG. 7c is an exemplary tyre pressure sensor module

FIG. 7c shows an alternative tyre pressure sensor module 730. Some of the features of the tyre pressure sensor module 730 of FIG. 7c are similar to those described above in relation to the tyre pressure sensor module 700 of FIGS. 7a and b. As such, a description of these features is not given again here and corresponding reference numerals are used to identify them in FIG. 7c.

The tyre pressure sensor module 730 comprises a housing split into a forward portion 738, a rear portion 740, and sensor electronics 712 comprising a pressure sensor 714. The sensor electronics 712 may be mounted on a printed circuit board (PCB) 748.

The tyre pressure sensor module 730 may comprise a protruded portion 731. Specifically, the rear portion 740 may comprise the protruded portion 731. The protruded portion 731 may be configured to receive an antenna for communicating with a mobile electronic device, as described below.

Exemplary tyre pressure sensor modules 730 may comprise a plurality of PCBs. For example, the exemplary tyre pressure sensor module 730 comprises two PCBs 748a, 748b, however the skilled person will appreciate that any number of PCBs may be utilised. The PCBs 748a, 748b may be stacked. Each PCB 748a, 748b may comprise sensor electronics.

The exemplary tyre pressure sensor module 730 may further comprise locating features configured to facilitate the correct placement of the PCB(s) within the housing. In the exemplary tyre pressure sensor module 730, at least one of the PCBs 748a,b may comprise a locating recess 750 configured to engage with corresponding locating member 752 on the housing (for example, the forward portion 738 of the housing). In the exemplary tyre pressure sensor module 730, the PCB 748b comprises three locating recesses 750a-c and the housing comprises three corresponding locating members 752a-c, however the skilled person will appreciate that any number of locating recesses and locating members may be utilised.

In the exemplary tyre pressure sensor module 730, at least one locating member 752a-c may be configured to hold the PCBs 748a, 748b at a desired height within the housing. At least one locating member 752a-c may comprise a lug 756 configured to be received within a corresponding recess 754 of the PCB 748a. The locating member 752 may further comprise an engagement surface 758 configured to abut a surface of the PCB 748a when the lug 756 is received within the recess 754. In alternative arrangements, the locating member may comprise an engagement surface (without the lug). This allows the PCB(s) 748a, 748b to be received by the housing and held within the housing at the correct height (the skilled person will appreciate that the height at which the PCB(s) 478 are held can be adjusted by altering the height of the engagement surface 758).

Exemplary tyre pressure sensor modules may comprise a fastener 760 configured to secure the PCB(s) to the housing. The fastener 760 may be configured to secure the PCB(s) to the forward portion 738 of the housing. The fastener may be a screw, a bolt, a nail or any other suitable type of fastener. The exemplary tyre pressure sensor module 730 shown in FIG. 7c comprises three fasteners configured to secure the PCB 748 to the forward portion 738, however the skilled person will appreciate that substantially any number of fasteners may be used. The PCB may comprise a plurality of holes 762 for receiving the fasteners 736. The forward portion 738 may comprise a plurality of fastening ports 764 configured to engage the fasteners 760, to secure the PCB(s) 748 to the forward portion 738.

It will be understood that the features described with respect to the tyre pressure sensor module 700 of FIG. 7a may be utilised in the tyre pressure sensor module 730 of FIG. 7c. As such, the different drawings are not necessarily to be considered as separate embodiments and features from one drawing may be transferred to an apparatus in another drawing.

Figure 9:
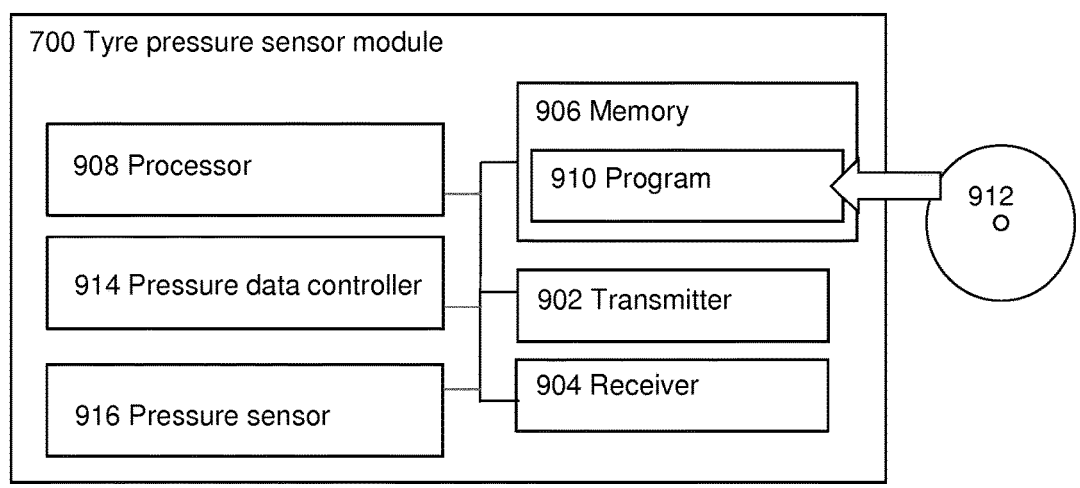
FIG. 9 is a schematic representation of an exemplary tyre pressure sensor module.

FIG. 9 shows a schematic representation of a tyre pressure sensor module 900, which may be the tyre pressure sensor module of FIGS. 7a-c, 8a or 8b. The tyre pressure sensor module 900 comprises a transmitter 902 and a receiver 904. The receiver 904 may comprise an antenna as discussed above, configured to receive a short range RF signal and configured to draw electrical power therefrom. The transmitter 902 and receiver 904 may be in data communication with other entities in a tyre pressure gauge system, such as a mobile electronic device 102 and are configured to transmit and receive data accordingly. In particular, the transmitter 902 and receiver 904 may be configured to transmit and receive data using a short range radio frequency (RF) signal, such as an NFC signal, as discussed above.

The tyre pressure sensor module further comprises a memory 906 and a processor 908. The memory 906 may comprise a non-volatile memory and/or a volatile memory. The memory 906 may have a computer program 910 stored therein. The computer program 910 may be configured to undertake the methods disclosed herein. The computer program 910 may be loaded in the memory 906 from a non-transitory computer readable media 912, on which the computer program is stored. The tyre pressure sensor module 700 further comprises a pressure sensor 916 configured to determine pressure within a tyre when fitted to a valve thereof. The processor 908 may be configured to undertake the function of a pressure data controller 914 as set out herein.

Each of the transmitter 902 and receiver 904, memory 906, processor 908, pressure data controller 914, pressure sensor 916 may be in data/electrical communication with the other features 902, 904, 906, 908, 910, 914, 916 of the tyre pressure sensor module 700. The tyre pressure sensor module 700 can be implemented as a combination of computer hardware and software. In particular, pressure data controller 914 may be implemented as software configured to run on the processor 908. The memory 906 stores the various programs/executable files that are implemented by a processor 908, and also provides a storage unit for any required data. The programs/executable files stored in the memory 906, and implemented by the processor 908, can include the pressure data controller 914 but are not limited to such.

As discussed above, exemplary tyre pressure sensor modules are battery-less. This, combined with the use of a smaller antenna allows for the reduced size and weight of exemplary tyre pressure sensor modules.

The use of a smaller antenna also provides for a less complex system by reducing the distance over which the antenna of the tyre pressure sensor module can obtain sufficient power to enable tyre pressure to be determined. As discussed above, because only tyre pressure sensor modules within a small range can be read, it is clear which sensor module is providing a particular pressure reading. This means that there is no requirement for identification of individual tyre pressure sensor modules when transmitting pressure data.

In alternative arrangements, exemplary tyre pressure sensors may be configured to transmit identification data. The identification data may be unique to the tyre pressure sensor module. The identification data may be transmitted by the tyre pressure sensor module when the pressure data is transmitted. That is, the identification data may be transmitted in response to a request for data from the mobile electronic device. The identification data may associate the pressure data with a particular tyre pressure sensor module (and as such, the corresponding wheel of the vehicle to which the tyre pressure sensor module is coupled). Such identification data may comprise a number, letter, or colour.

The identification data may be used when storing tyre pressure data, as described in more detail below. The identification data provides an indication of which tyre pressure sensor modules is associated with which tyre pressure reading(s). This may be useful when viewing a list of many readings from different vehicles and/or tyres, as each reading may be associated with a particular vehicle and/or tyre.

Exemplary tyre pressure sensor modules comprise only sensors for measuring tyre pressure. That is, exemplary tyre pressure sensor modules may not comprise any sensors for monitoring a parameter of the tyre and/or wheel other than the pressure sensor. Specifically, the tyre pressure sensor module may not including a temperature sensor and/or a motion sensor. Again, this provides a much lower power, smaller, lighter and lower cost sensor unit than, for example, a TPMS. It is noted that this is against the direction of innovation in the art, which is towards greater functionality and a greater numbers of features.

It is also against the direction of innovation in the art to reduce the transmission distances between the tyre pressure sensor module and the mobile electronic device. The below table demonstrates the large effects that the width and diameter of a circular loop antenna has on inductance, and therefore transmission range.

| | Turns | Antenna Diameter (cm) | Width (cm) | Inductance (µH) |
| --- | --- | --- | --- | --- |
| Example | 10 | 2 | 0.8 | 2.34 |
| Double Turns (20) | 20 | 2 | 0.8 | 9.37 |
| Halve Turns (5) | 5 | 2 | 0.8 | 0.59 |
| Double antenna Diameter (4) | 10 | 4 | 0.8 | 6.35 |
| Halve Antenna Diameter (1) | 10 | 1 | 0.4 | 1.17 |
| Halve Antenna Width (4) | 10 | 2 | 0.4 | 3.17 |

As can be seen, reducing the diameter (and therefore surface area) of the antenna significantly reduces the inductance and therefore the transmission range (both laterally and vertically). Similarly, a reduction in the number of turns of the antenna significantly reduces the inductance and therefore the transmission range. It is noted that the term "turns" as used in the context of antennas encompasses concentric, spiraled revolutions of a material forming the antenna. This will be understood by the skilled person.

Reducing the transmission distances means that the transmitter of the mobile electronics device must be more accurately located with respect to the antenna of the tyre pressure sensor module in both the lateral and vertical directions. For many vehicles, the tyre pressure sensor module may be mounted to a tyre in a position such that it is not visible to the user. As such, the user may be unable to position the mobile electronics device relative to the tyre pressure sensor in such a way to allow a pressure reading to be taken and transmitted.

An exemplary method for reading tyre pressure using apparatus disclosed herein is described below.

The mobile electronic device 102 is placed in close proximity to a tyre pressure sensor module 700. In exemplary systems, close proximity may encompass distances up to 4 cm, up to 3 cm, up to 2 cm or up to 1 cm. In many exemplary arrangements, close proximity is a distance sufficiently close to allow an NFC (or other short range telecommunications signals such as an RF signal, including RFID) transmission from the mobile electronic device 102 to be detected by the antenna of the receiver 904 of the tyre pressure sensor module 700 using one of the transmission means disclosed herein.

The transmitter 202 of the mobile electronic device 102 transmits a short range telecommunications signal, such as NFC or RFID, to the tyre pressure sensor module. The short range telecommunications signal may be a request for a tyre pressure measurement. The transmission may be undertaken using NFC transmission techniques. The short range telecommunications signal may therefore have a range of up to 4 cm, up to 3 cm, up to 2 cm or up to 1 cm. The short range telecommunications signal transmission may be in response to a user input, for example a user pressing a button on the mobile electronic device 102. The transmitter 202 of the mobile electronic device 102 may use a transmission frequency of 13.56 MHz.

In exemplary methods, the mobile electronic device 102 and the tyre pressure module 100 communicate via inductive coupling when the antenna of the tyre pressure sensor module 700 is within range of the transmitter 202 and/or receiver 200 of the mobile electronic device 102.

The receiver 904 of the tyre pressure sensor module 700 detects the short range telecommunications signal transmission from the mobile electronic device 102. In exemplary tyre pressure gauge systems, the telecommunications signal is received at the antenna, which is configured to induce a voltage in the tyre pressure sensor module sufficient to power the tyre pressure sensor module to take a measurement of a pressure of a fluid within the pneumatic tyre and transmission of data indicative of the measured pressure to the mobile electronic device 102. On receipt of the short range telecommunications signal, the pressure sensor 714 therefore determines the pressure of the air in the tyre of the respective wheel of the vehicle.

The pressure data controller 914 controls the transmitter 902 to transmit pressure data indicative of the determined tyre pressure to the mobile electronic device 102. The transmitter may transmit the data via a short range telecommunications signal having a range of less than 4 cm, such as an NFC RF signal or an RFID RF signal. In other arrangements, a different telecommunications protocol may be used to transmit the pressure data.

In exemplary methods, the tyre pressure sensor module 700 may be further configured to transmit identification data in response to the short range telecommunications signal received from the mobile electronic device 102. The identification data may associate the pressure data with a corresponding tyre pressure sensor module (and therefore the corresponding wheel of the vehicle to which the tyre pressure sensor module is coupled). The identification data may be transmitted via a short range telecommunications signal having a range of less than 4 cm, such as an NFC RF signal or an RFID RF signal. In other arrangements, a different telecommunications protocol may be used to transmit the identification data.

The receiver 200 of the mobile electronic device 300 receives the tyre pressure data and may display the tyre pressure to the user. In exemplary methods, the receiver may also receive the identification data and display this to the user in addition to the tyre pressure. The user then moves to the next tyre/wheel of the vehicle and repeats the process to determine the pressure at each tyre pressure sensor module.

In exemplary mobile electronic devices the tyre pressure data received by the mobile electronic device 300 may be compared to a desired tyre pressure in order to determine whether the tyre is at a safe pressure or whether the tyre is in need of inflation. A warning may be displayed to the user if the measured tyre pressure is less than a threshold. The threshold may be defined as a percentage of the desired tyre pressure.

Exemplary mobile electronic devices may comprise a user interface through which the user can programme and/or control the mobile electronic device 300. For example, the user may input into the mobile electronic device, via the user interface, a desired tyre pressure for a particular tyre of a vehicle. The user interface may comprise a display screen configured to display data to the user. The display screen may be a touchscreen configured to display data to the user and to allow a user to make user inputs to the screen to programme and/or control the mobile electronic device 300.

Exemplary mobile electronic devices may be configured to transmit data confirming whether the pressure of the tyre has been checked to a server connected to a network.

The server may be configured to store the data confirming that the pressure of the tyre has been checked. The server may be a virtual server, such as a Cloud server.

In some arrangements, a signal confirming a pressure check has taken place may be transmitted to the server by the transmitter 202 of the mobile electronic device. Alternatively, the transmitter 202 of the mobile electronic device 102 may be configured to transmit the received tyre pressure data and/or the identification data to the server. The tyre pressure data and/or identification data may be timestamped to indicate the time at which the pressure measurement was taken or the time at which the measured pressure/identification data was received by the mobile electronic device. The server may be configured to store the measured pressure and/or identification data received from the mobile electronic device.

Transmitting the tyre pressure data and/or identification data to the server and storing the data thereon allows a third party, for example, to track whether/when pressure measurements have been taken. This may allow, for example, the monitoring of multiple drivers to determine whether they have checked the tyre pressures of their vehicle before beginning a journey (or at predetermined checkpoints). In arrangements in which the pressure data is transmitted to the server, this also allows monitoring of whether drivers have started their journey despite the tyre not being at a safe pressure.

Figure 10:
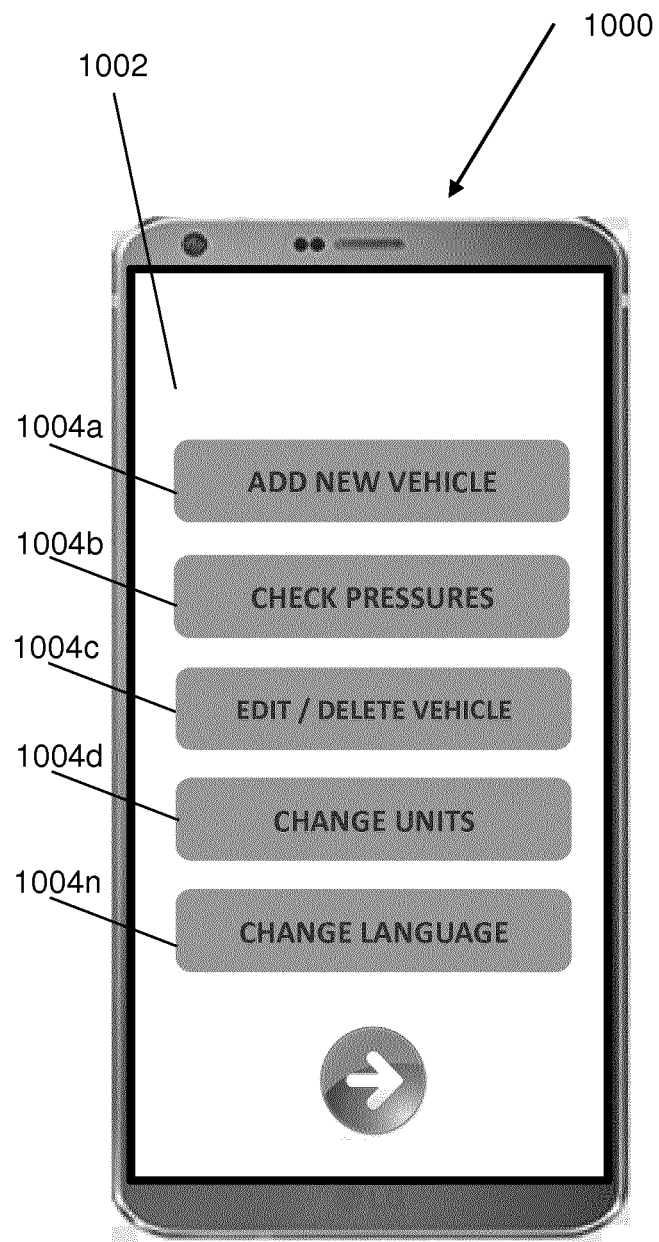
FIG. 10 is an exemplary mobile electronic device.
Figure 11:
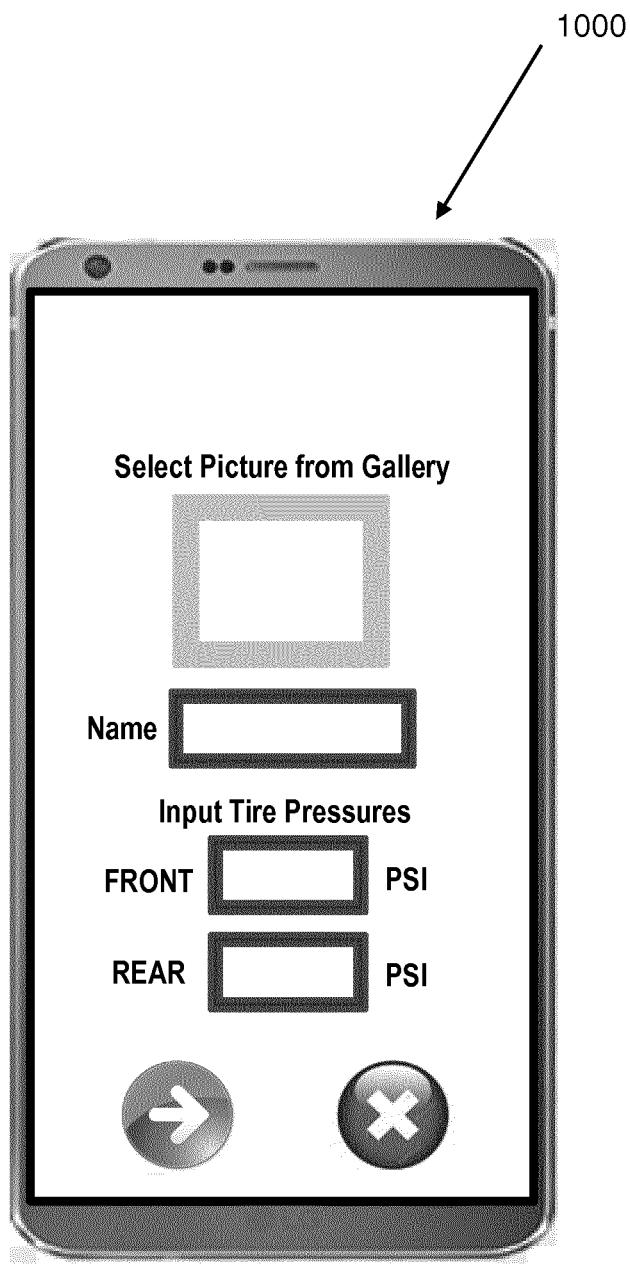
FIG. 11 is an exemplary mobile electronic device.

FIG. 10 shows an exemplary mobile electronic device 1000, which is a smartphone. The mobile electronic device 1000 comprises a touchscreen 1002, which displays selectable icons 1004*a-n*. The user may make user inputs to navigate the user interface via the selectable icons 1004*a-n*. For example, the user may select one of the icons 1004*a-n* to navigate to the screen as shown in FIG. 10*b*, which allows the user to make a user input to define a desired pressure value that would indicate that a tyre is of a safe pressure. In some arrangements, a desired front tyre pressure and a desired back tyre pressure may be separately definable.

When a pressure reading is taken by the mobile electronic device in the manner described above, the measured tyre pressure may be compared to a threshold to determine whether the tyre is safe or underinflated. If the desired front pressure and the desired back pressure are of different values, once the tyre pressure reading is received by the mobile electronic device 1000 from the tyre pressure sensor module 100, the user may receive a prompt to indicate whether the tyre that the pressure reading is associated with is a front or back tyre.

In exemplary mobile electronic devices, the user may be alerted if the measured tyre pressure is lower than the threshold. The alert could be visual, audio or haptic.

In a particular example, a warning may be displayed to the user if the measured tyre pressure is lower than the threshold. This could be displayed to the user in a traffic-light fashion, with green indicating that the tyre is safe, amber indicating that the tyre needs to be inflated and red indicating that the tyre is unsafe.

The threshold may be user-configurable or alternatively, pre-programmed into the mobile electronic device 1000. In exemplary mobile electronic devices, the threshold may be defined as a percentage of the desired pressure value. For example, the threshold may be defined as approximately 12% of the desired tyre pressure, such that a measured tyre pressure of less than 12% of the desired tyre pressure value indicates that the tyre needs to be inflated. A second threshold may indicate that the tyre is unsafe. For example a second threshold may be set at approximately 18% of the desired tyre pressure, such that a measured tyre pressure of less than 18% of the desired tyre pressure value indicates that the tyre is unsafe.

In exemplary mobile electronic devices 1000, the user may create a plurality of vehicle profiles and input different desired tyre pressure values and thresholds associated with tyres of a particular vehicle. In this way, a single mobile electronic device may be utilised with a number of different vehicles and tyre pressure sensor modules.

The user interface may further allow the user to select the units (psi or bar) that the measured pressure reading should be displayed in and/or the language.

A computer program may be configured to provide at least part of any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Alternative applications of the methods and apparatus described herein are also considered. Such applications need not be limited to the measurement of tyre pressure or, indeed, for use in connection with vehicles. In such applications, a sensor module may be provided which comprises sensors for monitoring other environmental parameters. Such parameters may include pressure, temperature, motion, humidity, and/or light intensity. For example, when environmental parameters of a building are desired to be monitored, sensor modules may be placed around a building (or a room of a building) for monitoring these parameters. A mobile electronic device substantially similar to those described herein may be provided which may receive data in the manner described above, from the sensor module and display this data to the user.

It will be appreciated that such sensor modules may be structurally different from the tyre pressure sensor modules 700, 730. For example, the tyre pressure sensor modules 700, 730 are configured to engage a Schrader valve. It will be appreciated that in alternative applications, this may not be necessary.

According to such an exemplary application, there may be provided an environmental sensor module comprising an antenna configured to detect a short range telecommunications signal from a mobile electronic device over a distance of up to 4 cm. The antenna may be configured to obtain, from the short range telecommunications signal through induction, electrical power sufficient to allow measurement of one or more environmental parameters and transmission of data indicative of the one or more measured environmental parameters to the mobile electronic device. The environmental sensor module may further comprise a receiver configured to receive the short range telecommunications signal comprising the a request to obtain one or more environmental parameter readings. The environmental sensor module may further comprise an environmental parameter sensor configured to measure one or more environmental parameters in response to the request. The environmental sensor module may further comprise a transmitter configured to transmit data indicative of the measured environmental parameter to the mobile electronic device using a short range telecommunications signal over a distance of up to 4 cm.

The mobile electronic device may the mobile electronic device 102 described above.

The environmental parameters may comprise pressure, temperature, motion, humidity, and/or light intensity. Correspondingly the environmental parameter sensor may comprise a pressure sensor, a temperature sensor, a motion sensor, a humidity sensor and/or a light intensity sensor.

It is further contemplated that the features, characteristics, methods, and systems described in relation to the tyre pressure sensor module disclosed herein may also apply, mutatis mutandis, to the environmental sensor module described above.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A kit of parts comprising:
   a tyre pressure sensor module for fitting to a valve of a pneumatic tyre, the tyre pressure sensor module comprising:
      an antenna configured to detect a short range telecommunications signal from a mobile electronic device over a distance of up to 4 cm, the antenna further configured to obtain, from the short range telecommunications signal through induction, electrical power sufficient to allow measurement of a pressure of a fluid within the pneumatic tyre and transmission of data indicative of the measured pressure to the mobile electronic device;
      a receiver configured to receive the short range telecommunications signal, which comprises instructions to obtain a pressure reading;
      a pressure sensor configured to measure the pressure of the fluid within the pneumatic tyre; and
      a transmitter configured to transmit data indicative of the measured pressure to the mobile electronic device using a short range telecommunications signal over a distance of up to 4 cm; and
   a locating feature for securing to a housing of a mobile electronic device, wherein at least part of the tyre pressure sensor module is configured to be received within the locating feature to locate the tyre pressure sensor module in a position relative to the mobile electronic device to permit transmission of the short range telecommunications signal from the tyre pressure sensor module to the mobile electronic device, and to provide an indication to a user of the mobile electronic device that the tyre pressure sensor module is correctly located with respect to the transmitter and/or receiver of the mobile electronic device such that the tyre pressure sensor module is located within 4 cm or less of the tyre pressure sensor module.

2. A kit of parts according to claim 1, wherein the antenna is a loop antenna with a diameter of 10 mm, a width of substantially 0.15 mm and substantially 14 turns.

3. A kit of parts according to claim 1, wherein the tyre pressure sensor module comprises no sensors for monitoring a parameter of the tyre and/or wheel other than the pressure sensor and specifically not including a temperature sensor and/or a motion sensor.

4. A kit of parts according to claim 1, wherein the locating feature comprises an adhesive coating on an underside thereof for adhering to the housing of the mobile electronic device.

5. A kit of parts according to claim 1, wherein the indication comprises a haptic indication.

6. A kit of parts according to claim 1, further comprising the mobile electronic device comprising:
   a transmitter configured to transmit a telecommunications signal to the tyre pressure sensor module over a distance of up to 4 cm, wherein the telecommunications signal is configured to be received by the tyre pressure sensor module and to instruct the tyre pressure sensor module to transmit a tyre pressure reading;
   a receiver configured to receive a telecommunications signal from the tyre pressure sensor module over a distance of up to 4 cm, the received telecommunications signal comprising the tyre pressure reading.

7. A kit of parts according to claim 1, wherein at least part of the tyre pressure sensor module is configured to be received within the locating feature.

8. A kit of parts according to claim 3, wherein the tyre pressure sensor module comprises a keyed recess configured to be received within a correspondingly keyed portion of the locating feature.

9. A kit of parts according to claim 6, wherein the transmitter of the tyre pressure sensor module is further configured to transmit identification data to the mobile electronic device.

10. A kit of parts according to claim 9, wherein the identification data associates the data indicative of the measured pressure with the tyre pressure sensor module.

11. A tyre pressure gauge system comprising:
   a mobile electronic device and a tyre pressure sensor module, the tyre pressure sensor module for fitting to a valve of a pneumatic tyre,
   wherein the tyre pressure sensor module comprises an antenna configured to receive a telecommunications signal from the mobile electronic device and obtain therefrom, through induction, electrical power sufficient to allow measurement of a pressure of a fluid within the pneumatic tyre and transmission of data indicative of the measured pressure to the mobile electronic device, the tyre pressure sensor module further comprising a pressure sensor configured to measure the tyre pressure and a transmitter configured to transmit data indicative of the measured pressure to the mobile electronic device,
   wherein the mobile electronic device comprises a locating feature, wherein at least part of the tyre pressure sensor module is configured to be received within the locating feature to locate the tyre pressure sensor module in a position relative to the mobile electronic device to permit transmission of the short range telecommunications signal from the tyre pressure sensor module to the mobile electronic device, and to provide an indication to a user of the mobile electronic device that the tyre pressure sensor module is correctly located with respect to the transmitter and/or receiver of the mobile electronic device such that the tyre pressure sensor module is located within 4 cm or less of the tyre pressure sensor module.

12. A tyre pressure gauge system according to claim 11, wherein the mobile electronic device further comprises a transmitter configured to transmit the telecommunications signal comprising a request for a tyre pressure reading to the tyre pressure sensor module over a distance of up to 4 cm, and
a receiver configured to receive, from the tyre pressure sensor module, the transmitted data indicative of the tyre pressure reading over a distance of up to 4 cm.

13. A tyre pressure gauge system according to claim 11, wherein the locating feature is configured to receive at least part of the tyre pressure sensor module.

14. The tyre pressure gauge system according to claim 13, wherein the locating feature comprises a keyed recess into which a correspondingly keyed portion of the tyre pressure sensor module may be received.

15. The tyre pressure gauge system according to claim 11, wherein the locating feature further comprises an indicator unit configured to provide one or more of an audio, visual or haptic indication to the user.

16. The tyre pressure gauge system according to claim 11, wherein the receiver is configured, upon receiving the telecommunications signal from the tyre pressure sensor module, to control the indicator unit to provide the indication to the user.

17. The tyre pressure gauge system according to claim 11, wherein the short range telecommunications protocol comprises a near-field communication (NFC) telecommunications protocol.

18. A method for obtaining a tyre pressure reading from a tyre pressure sensor module fitted to a valve of a pneumatic tyre, the method comprising:
receiving by a locating feature secured to or forming part of a mobile electronic device, at least part of the tyre pressure sensor module to locate the tyre pressure sensor module in a position relative to the mobile electronic device to permit transmission of a telecommunications signal from the tyre pressure sensor module to the mobile electronic device, and to provide an indication to a user of the mobile electronic device that the tyre pressure sensor module is correctly located with respect to the transmitter and receiver of the mobile electronic device such that the tyre pressure sensor module is located within 4 cm or less of the tyre pressure sensor module.
transmitting, by a transmitter of the mobile electronic device, a telecommunications signal to the tyre pressure sensor module over a distance of up to 4 cm once the indication has been received, wherein the telecommunications signal is received by the tyre pressure sensor module and instructs the tyre pressure sensor module to transmit a tyre pressure reading; and
receiving, by a receiver of the mobile electronic device, a telecommunications signal from the tyre pressure sensor module over a distance of up to 4 cm, the received telecommunications signal comprising the tyre pressure reading.

19. A method according to claim 18, further comprising:
detecting, by an antenna of the tyre pressure sensor module, the telecommunications signal from the mobile electronic device comprising instructions to obtain a pressure reading;
obtaining, by the antenna and from the telecommunications signal through induction, electrical power sufficient to allow measurement of a pressure of a fluid within the pneumatic tyre and transmission of data indicative of the measured pressure to the mobile electronic device;
measuring, by a pressure sensor of the tyre pressure sensor module, the pressure of the fluid within the pneumatic tyre; and
transmitting, by a transmitter of the tyre pressure sensor module, the telecommunications signal comprising the tyre pressure reading.

20. A method according to claim 18, further comprising transmitting to the mobile electronic device, by the transmitter of the tyre pressure sensor module, identification data, wherein the identification data associates the data indicative of the measured pressure with the tyre pressure sensor module.

* * * * *